United States Patent
Chun et al.

(10) Patent No.: US 8,891,470 B2
(45) Date of Patent: Nov. 18, 2014

(54) METHOD AND APPARATUS FOR FEEDBACK TRANSMISSION IN A WIRELESS COMMUNICATION SYSTEM

(75) Inventors: Jin Young Chun, Anyang-si (KR); Wook Bong Lee, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 188 days.

(21) Appl. No.: 13/578,219

(22) PCT Filed: Feb. 10, 2011

(86) PCT No.: PCT/KR2011/000879
§ 371 (c)(1),
(2), (4) Date: Aug. 28, 2012

(87) PCT Pub. No.: WO2011/099779
PCT Pub. Date: Aug. 18, 2011

(65) Prior Publication Data
US 2012/0320857 A1    Dec. 20, 2012

Related U.S. Application Data

(60) Provisional application No. 61/302,965, filed on Feb. 10, 2010.

(30) Foreign Application Priority Data

Feb. 9, 2011    (KR) .......................... 10-2011-0011289

(51) Int. Cl.
*H04W 4/00* (2009.01)
*H04L 1/00* (2006.01)
*H04L 5/00* (2006.01)

(52) U.S. Cl.
CPC ............ *H04L 1/0026* (2013.01); *H04L 1/0027* (2013.01); *H04L 5/0055* (2013.01); *H04L 5/0007* (2013.01); *H04L 5/0057* (2013.01); *H04L 5/0091* (2013.01)
USPC ........................... 370/329; 370/252; 370/338

(58) Field of Classification Search
None
See application file for complete search history.

(56) References Cited

U.S. PATENT DOCUMENTS

| | | |
|---|---|---|
| 2007/0274253 A1 | 11/2007 | Zhang et al. |
| 2009/0201825 A1 | 8/2009 | Shen et al. |
| 2010/0260234 A1* | 10/2010 | Thomas et al. ............... 375/141 |
| 2010/0273435 A1* | 10/2010 | Sun et al. .................... 455/67.13 |
| 2010/0329316 A1* | 12/2010 | Sun et al. ....................... 375/221 |

FOREIGN PATENT DOCUMENTS

KR    10-2010-0090180    8/2010

* cited by examiner

*Primary Examiner* — David Oveissi
(74) *Attorney, Agent, or Firm* — Mckenna Long & Aldridge LLP

(57) ABSTRACT

The present invention provides a method and an apparatus for feedback transmission in a wireless communication system. A terminal receives downlink control information from a base station and transmits to the base station event-driven feedback information over a first feedback channel. The downlink control information includes information about a short-term feedback period that corresponds to a short period of time for transmitting feedback information and information about a long-term feedback period that corresponds to a long period of time for transmitting feedback information, and the event-driven feedback information is transmitted on the basis of the long-term feedback period.

7 Claims, 10 Drawing Sheets

METHOD AND APPARATUS FOR FEEDBACK TRANSMISSION IN A WIRELESS COMMUNICATION SYSTEM

This Application is a 35 U.S.C. §371 National Stage Entry of International Application No. PCT/KR2011/000879, filed Feb. 10, 2011 and claims the benefit of U.S. Provisional Application No. 61/302,965, filed Feb. 10, 2010, and Korean Application No: 10-2011-0011289, filed Feb. 9, 2011, all of which are incorporated by reference in their entirety herein.

BACKGROUND OF THE INVENTION

1. Field of the Invention

The present invention relates to wireless communication and, more specifically, to a method and apparatus for transmitting feedback in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

A user equipment (UE) may transmit a feedback through uplink. The feedback may include channel information necessary for data transmission. A base station (BS) may schedule radio resources using the feedback received from the UE and transmit data. A closed loop scheme is a scheme of transmitting data by compensating for channel information included in a feedback from UE, and an open loop scheme is a scheme of transmitting data by not compensating for channel information included in a feedback from UE. A feedback may not be transmitted according to the open loop scheme, and a BS may do not use channel information included in a feedback although the channel information is included in the feedback. In general, in a wireless communication system, the open loop scheme may be applied to a channel environment for UE that moves at high speed, and the closed loop scheme may be applied to a channel environment for UE that moves at low speed. The open loop scheme is applied to a channel for UE that moves at high speed because the channel is greatly changed, making channel information, included in a feedback, difficult to be reliable. The closed loop scheme may be applied to a channel environment for UE that moves at low speed because the channel environment is relatively less changed and channel information included in a feedback is reliable and less sensitive to delay.

The uplink control channel carries various types of pieces of feedback information. The pieces of feedback information may include a channel quality indicator (CQI), MIMO feedback, acknowledgment/non-acknowledgement (ACK/NACK), an uplink synchronization signal, a bandwidth request, etc. The pieces of feedback information may be combined in various ways depending on a channel environment or a predetermined configuration and transmitted and may be classified into short-term period feedback information transmitted in a short period, long-term period feedback information transmitted in a relatively long period, and event-driven feedback information transmitted whenever a specific event occurs depending on the type of feedback information.

There is a need for a method for transmitting event-driven feedback information efficiently.

SUMMARY OF THE INVENTION

The present invention provides a method and apparatus for transmitting feedback in a wireless communication system.

In an aspect, a method of a transmitting, by a mobile station, a feedback in a wireless communication system is provided. The method includes receiving downlink control information from a base station, and transmitting event-driven feedback information to the base station on a first feedback channel, wherein the downlink control information comprises information about a short-term feedback period that is a short period in which feedback information is transmitted and information about a long-term feedback period that is a long period in which feedback information is transmitted, and the event-driven feedback information is transmitted based on the long-term feedback period.

The first feedback channel may be indicated by a first feedback channel indicator transmitted on a second feedback channel, and the first feedback channel indicated by the first feedback channel indicator may be transmitted instead of a next second feedback channel of the second feedback channel.

The first feedback channel indicator may be transmitted in each long-term feedback period.

The first feedback channel indicator may have a length of 1 bit.

The event-driven feedback information may be transmitted on the first feedback channel using a first feedback channel encoding type 0.

At least one of an index of a subband having a best channel state, a subband channel quality indicator (CQI), and an STC rate may be transmitted on the second feedback channel in each short-term feedback period.

The event-driven feedback information may be transmitted at a point of time at which the short-term feedback information is transmitted right before or right after a point of time at which the long-term feedback information is transmitted.

The event-driven feedback information may have a priority over the short-term feedback information or the long-term feedback information.

Transmitting the event-driven feedback information comprises generating a sequence based on the event-driven feedback information, modulating and repeating the generated sequence and mapping the generated sequence to a symbol, mapping the symbol to subcarriers of a feedback mini-tile (FMT), and transmitting the symbol mapped to the subcarriers.

The FMT may comprise 2 contiguous subcarriers and 6 orthogonal frequency division multiple access (OFDMA) symbols.

In another aspect, a mobile station is provided. The mobile station includes a radio frequency (RF) unit configured to receive downlink control information from a base station and transmit event-driven feedback information to the base station on a first feedback channel, and a processor connected to the RF unit and configured to process the downlink control information and the event-driven feedback information, wherein the downlink control information comprises information about a short-term feedback period that is a short period in which feedback information is transmitted and information about a long-term feedback period that is a long period in which feedback information is transmitted, and the event-driven feedback information is transmitted based on the long-term feedback period.

Event-driven feedback information can be efficiently transmitted.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
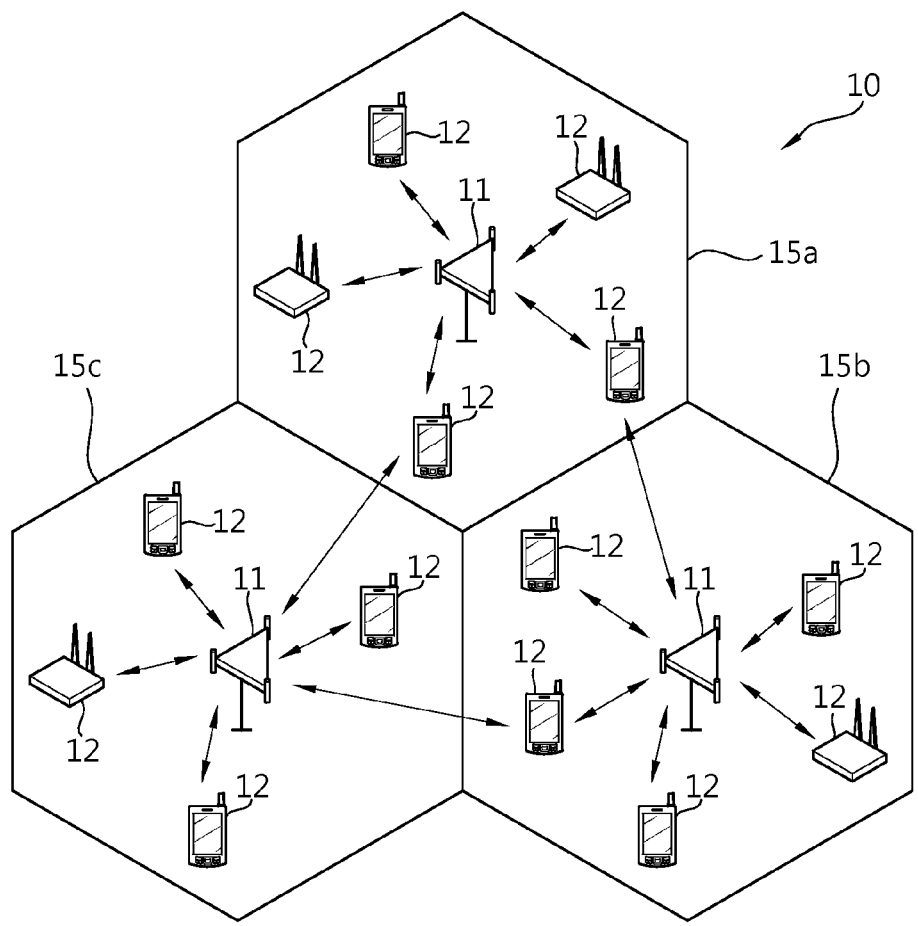
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
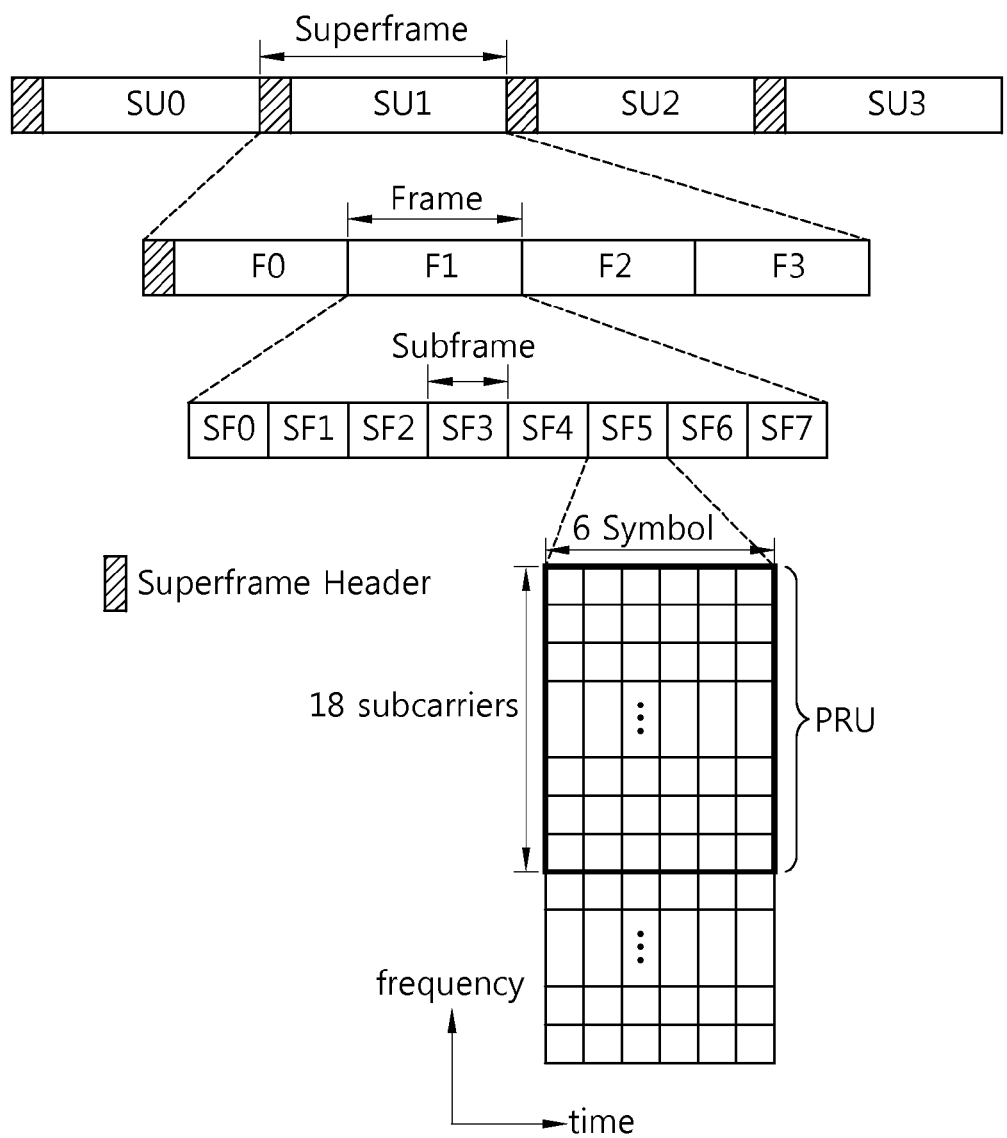
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) may carry an essential system parameter and system configuration information. The SFH may be located in a first subframe of a superframe. The SFH may occupy last 5 OFDMA symbols of the first subframe.

The SFH can be classified into a primary-SFH (P-SFH) and a secondary-SFH (S-SFH). The P-SFH and the S-SFH may be transmitted in every superframe. The S-SFH may be transmitted in two consecutive superframes. Information transmitted on the S-SFH may be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP2 includes information on initial network entry and network discovery. The S-SFH SP3 includes other important system information.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time, Tb(μs) | | | 91.4 | 128 | 102.4 | 91.4 | 91.4 |
| G = 1/8 | Symbol time, Ts(μs) | | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, Ts(μs) | | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |
| | TDD | Number of OFDMA symbols per 5 ms frame | 50 | 35 | 44 | 50 | 50 |
| | | TTG + RTG(μs) | 142.853 | 240 | 212.8 | 142.853 | 142.853 |
| G = 1/4 | Symbol time, Ts(μs) | | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$.
A sampling factor is defined as $F_s$ = floor(n · BW/8000) × 8000.
A subcarrier spacing is defined as $\Delta f = F_s/NFFT$.
A useful symbol time is defined as $T_b = 1/\Delta f$.
A CP time is defined as $T_g = G \cdot T_b$.
An OFDMA symbol time is defined as $T_s = T_b + T_g$.
A sampling time is defined as $T_b/N_{FFT}$.

Figure 3:
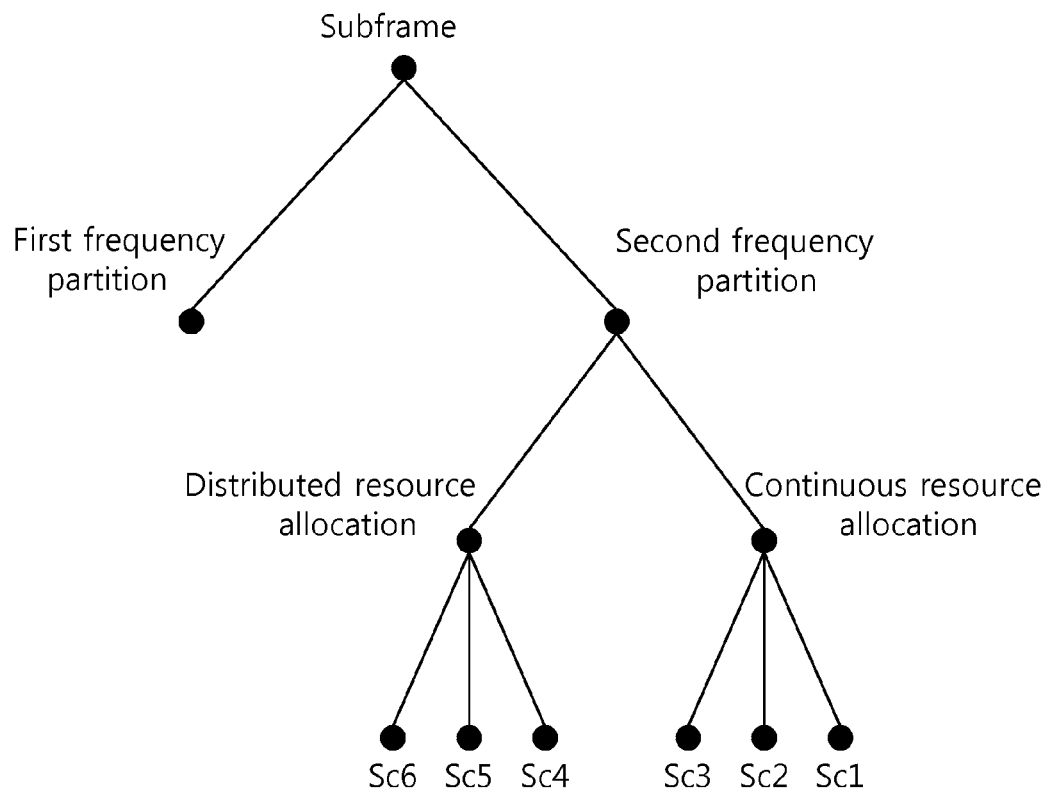
FIG. 3 shows an example of an uplink resource structure.

FIG. 3 shows an example of an uplink resource structure.

Each uplink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed PRUs. Each frequency partition may be used for other purposes such as fractional frequency reuse (FFR). The FP2 of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations.

A distributed logical resource unit (DLRU) can be used to obtain a frequency diversity gain. The DLRU includes a group of subcarriers distributed in one frequency partition. A minimum unit of constituting the DLRU may be a tile. An uplink DLRU may include a group of subcarriers distributed from 3 tiles. The tile may be defined as 6 subcarriers and Nsym OFMDA symbols.

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU.

Hereafter, a control channel used for transmitting a control signal or a feedback signal is described. The control channel may be used for transmission of various kinds of control signals for communication between a base station and a user equipment. The control channel described below may be applied to an uplink control channel and a downlink control channel.

The control channel is designed by taking the following points into consideration.

(1) A plurality of tiles included in a control channel can be distributed over the time domain or the frequency domain in order to obtain a frequency diversity gain. For example, assuming that a DRU includes three tiles each including six consecutive subcarriers on six OFDM symbols, the control channel includes the three tiles, and each of the tiles can be distributed over the frequency domain or the time domain. In some embodiments, the control channel can include at least one tile including a plurality of mini-tiles, and the plurality of mini-tiles can be distributed over the frequency domain or the time domain. For example, the mini-tile can consist of (OFDM symbols×subcarriers)=6×6, 3×6, 2×6, 1×6, 6×3, 6×2, 6×1 or the like. Assuming that a control channel, including (OFDM symbols×subcarriers) of IEEE 802.16e=the tiles of a 3×4 PUSC structure, and a control channel, including mini-tiles, are multiplexed through a Frequency Division Multiplexing (FDM) method, the mini-tiles can consist of (OFDM symbols×subcarriers)=6×2, 6×1, etc. When taking only the control channel, including the mini-tiles, into consideration, the mini-tiles can consist of (OFDM symbols× subcarriers)=6×2, 3×6, 2×6, 1×6 or the like.

(2) To support a high-speed mobile station, the number of OFDM symbols constituting a control channel must be a minimum. For example, in order to support a mobile station moving at the speed of 350 km/h, the number of OFDM symbols constituting a control channel is properly 3 or less.

(3) The transmission power of a mobile station per symbol is limited. To increase the transmission power of a mobile station per symbol, it is advantageous to increase the number of OFDM symbols constituting a control channel. Accordingly, a proper number of OFDM symbols has to be determined with consideration taken of (2) a high-speed mobile station and (3) the transmission power of a mobile station per symbol.

(4) For coherent detection, pilot subcarriers for channel estimation have to be uniformly distributed over the time domain or the frequency domain. The coherent detection method is used to perform channel estimation using a pilot and then find data loaded on data subcarriers. For the power boosting of pilot subcarriers, the number of pilots per OFDM symbol of a control channel has to be identical in order to maintain the same transmission power per symbol.

(5) For non-coherent detection, a control signal has to consist of orthogonal codes/sequences or semi-orthogonal codes/sequences or has to be spread.

An uplink control channel may include feedback channels, including a fast feedback channel (FFBCH) and an HARQ feedback channel (HFBCH), a sounding channel, a ranging channel, a bandwidth request channel (BRCH), etc. Pieces of information, such as CQI, MIMO feedback, ACK/NACK, an uplink synchronization signal, and a bandwidth request, can be transmitted by the uplink control channel. The feedback channel and the bandwidth request channel may be allocated to the first six OFDMA symbols of a subframe to which a sounding channel has not been allocated.

The uplink control channel may be allocated through downlink control information that is transmitted by a BS through downlink. The downlink control information may be broadcasted to all mobile stations (MSs) or may be transmitted to each MS through unicast service. A P-SFH or an S-SFH is a broadcasted downlink control signal, and a plurality of advanced-MAP information elements (A-MAP IEs) may be defined by the basic elements of unicast service control.

A feedback allocation A-MAP IE for the dynamic allocation or release of a feedback channel, from among the plurality of A-MAP IEs, may be transmitted to an MS. A feedback channel that may be allocated or released by the feedback allocation A-MAP IE includes a PFBCH and an SFBCH. If an MS has a feedback channel already allocated to a downlink carrier and a new feedback channel is further allocated to the corresponding downlink carrier, the existing feedback channel may be automatically released.

A period in which feedback is transmitted may be determined by the feedback allocation A-MAP IE. A short-term feedback period is defined as a period in which short-term feedback information that relatively frequently varies depending on a channel environment, from among pieces of feedback information, is transmitted. The short-term feedback information may include CQI, a precoding matrix indicator (PMI), etc. The short-term feedback information is transmitted for each $2^p$ frame by the short-term feedback period. A long-term feedback period is defined as a period in which long-term feedback information that does not frequently vary, from among pieces of feedback information, is transmitted. The long-term feedback information may include a subband index, MIMO feedback mode, etc. The long-term feedback information is transmitted for each $2^q$ frame by the long-term feedback period. When q=0, the long-term feedback information is not transmitted.

Furthermore, MIMO feedback mode (MFM) and a feedback format may be determined by the feedback allocation A-MAP IE. The MIMO feedback mode can support each MIMO transmission. A BS informs an MS of MIMO feedback mode when allocating a feedback channel, and the MS transmits feedback information according to the MIMO feedback mode. Support MIMO transmission mode is different depending on each MIMO feedback mode. The feedback format defines a feedback format index when transmitting feedback information through a feedback channel and may indicate the type of transmitted feedback information, etc. The feedback format may be differently defined depending on the MIMO feedback mode. That is, feedback information may be differently configured depending on the MIMO feedback mode, and a period in which the corresponding feedback information is transmitted may be differently configured.

An FFBCH carries the feedback of CQI and/or MIMO information, and it may be divided into two types of a primary fast feedback channel (PFBCH) and a secondary fast feedback channel (SFBCH). The PFBCH carries information of 4 to 6 bits and provides wideband CQI and/or MIMO feedback. The SFBCH carries information of 24 bits and provides narrow band CQI and/or MIMO feedback. The SFBCH can support a large number of control information bits using a high code rate. The PFBCH supports non-coherent detection which does not use a pilot, and the SFBCH supports coherent detection which uses a pilot. The fast feedback channel starts at a predetermined position, and the size of the fast feedback channel may be defined by a downlink control signal. The fast feedback channel may be periodically allocated. The number of fast feedback channels allocated to an MS by a BS may be one or less.

Table 2 shows an example of a feedback format when the MIMO feedback mode is 2.

TABLE 2

| Feedback Format | FBCH | # reports | | Feedback Fields | Description/Notes |
|---|---|---|---|---|---|
| 0 (M = 1) | PFBCH | 2 | Short | Subband CQI and STC rate (rate = 1 and 2) | Joint encoding of CQI and STC rate with PFBCH PFBCH encoding Type 0 |
| 0 (M = 1) | PFBCH | 2 | Long | Subband index | PFBCH encoding Type 1 |
| 1 (M = 1) | SFBCH | 1 | | Subband index Subband CQI STC rate PFBCH indicator | Subband index for 5, 10, or 20 MHz Support of STC rate 1 to 8 |
| 2 (M = 3) | SFBCH | 2 | Short | Subband avg CQI differential CQI | Subband index for 5, 10, or 20 MHz |
| 2 (M = 3) | SFBCH | 2 | Long | Subband index Wideband STC rate PFBCH indicator | Subband index for 5, 10, or 20 MHz |
| 3 (M = 5) | SFBCH | 2 | Short | Subband avg CQI differential CQI | Subband index for 5, 10, or 20 MHz |
| 3 (M = 5) | SFBCH | 2 | Long | Subband index Wideband STC rate PFBCH indicator | Subband index for 5, 10, or 20 MHz |

The MIMO feedback mode 2 supports open-loop MIMO. Here, narrow band feedback information is transmitted. That is, the feedback information may be measured one, three, or five selected subbands (M in Table 2) and transmitted through a PFBCH or an SFBCH. The feedback information is transmitted through the PFBCH when M=1 and transmitted through the SFBCH when M=3 or 5. CQI in a subband selected as short-term feedback information is transmitted and a subband index is transmitted as long-term feedback information.

Figure 4:
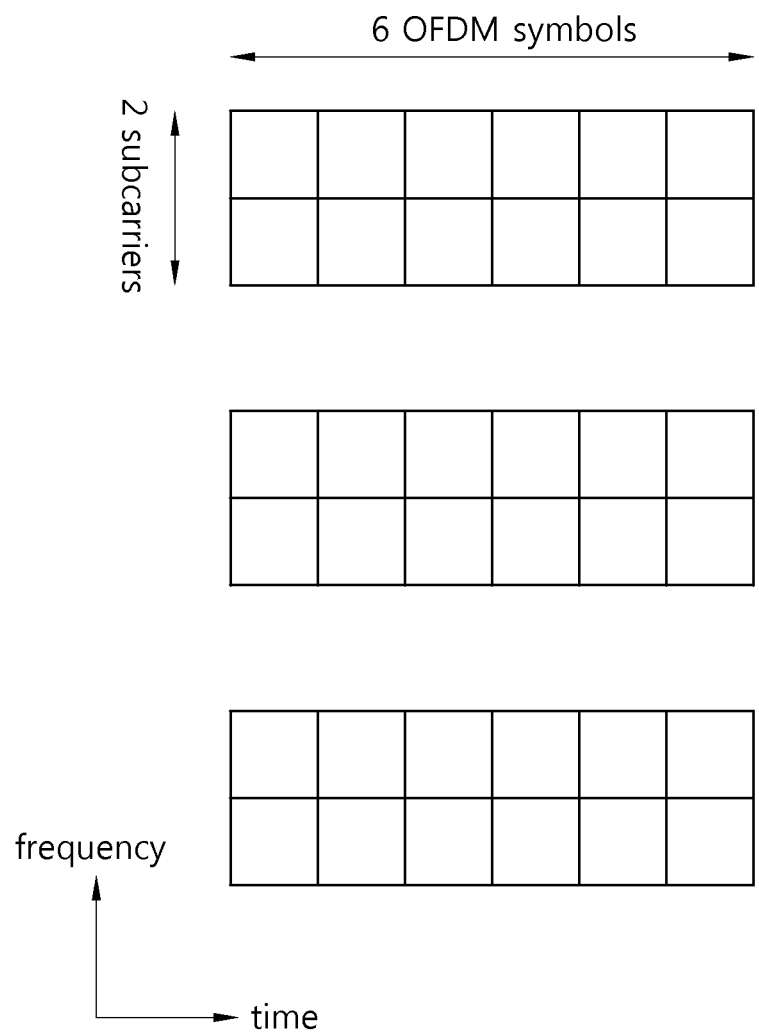
FIG. 4 shows an example of uplink resources used in a PFBCH.

FIG. 4 shows an example of uplink resources used in a PFBCH. An uplink feedback mini-tile (FMT) that consists of 2 contiguous subcarriers and 6 OFDMA symbols may be defined. The uplink feedback channel may be formed by applying uplink mini-tile permutation to an LRU allocated to a control channel. The PFBCH may include 3 distributed FMTs.

Figure 5:
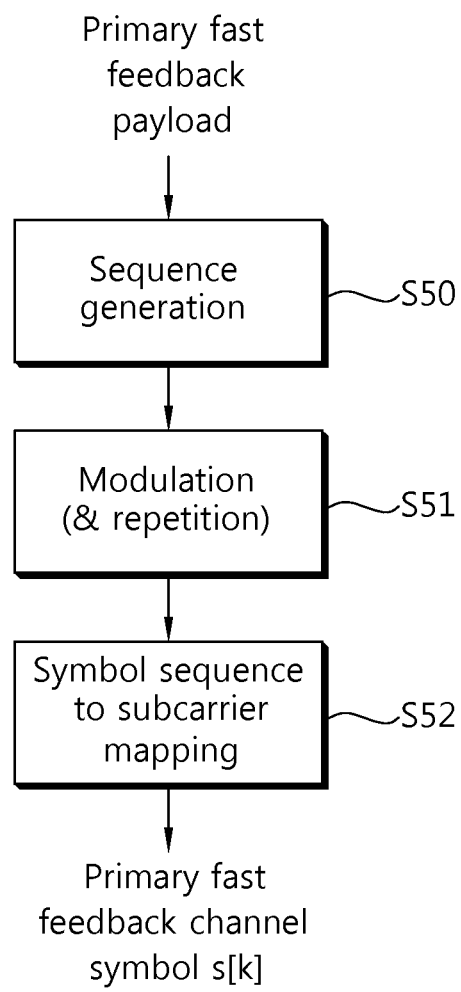
FIG. 5 is a block diagram showing a process in which feedback information is mapped to a PFBCH.

FIG. 5 is a block diagram showing a process in which feedback information is mapped to a PFBCH. At step S50, a PFBCH sequence is generated using a PFBCH payload. The PFBCH sequence may be selected from a predetermined PFBCH sequence set. At step S51, the generated PFBCH sequence is modulated, repeated, and mapped to an uplink PFBCH symbol s[k]. Here, 0 of the PFBCH sequence may be mapped as 1, and 1 thereof may be mapped as −1. At step S52, the uplink PFBCH symbol s[k] is mapped to the subcarrier of an FMT.

Table 3 shows an example of feedback contents transmitted through a PFBCH. The PFBCH may carry feedback information having a maximum of 6 bits.

TABLE 3

| PFBCH Feedback Content | Related MIMO feedback mode | Description/Notes |
|---|---|---|
| CQI | 0, 1, 2, 3, 4, 5, 6, 7 | 1) Wideband CQI 2) Subband CQI for Best-1 subband |
| STC Rate Indicator | 0, 1, 2, 3 | |
| Subband index | 2, 3, 5, 6 | Subband selection for best-1 subband |
| PMI | 3, 4, 6, 7 | 1) wideband PMI 2) subband PMI for best-1 subband |
| Event-driven Indicator (EDI) for request for switching MFM | N/A | Indicate request to switch MIMO feedback mode between distributed and localized allocations |
| EDI for Bandwidth Request Indicator | N/A | This is used to request Ul bandwidth. 2 sequences (two services) |
| EDI for Frequency partition selection (FPS) | N/A | AMS informs ABS about the frequency partition index (for MIMO feedback modes 0, 1, 4, 7) |
| EDI for Buffer management | N/A | Indicates occupancy status of HARQ soft buffer |

In the transmission of the PFBCH, four encoding types may be defined. An encoding type corresponding to an MIMO feedback mode (MFM) and a feedback format defined in a feedback allocation A-MAP IE may be used. An index value of 6 bits corresponding to feedback information defined in each encoding type may be transmitted through the PFBCH.

The encoding type 0 may be used to report a CQI, an STC rate, or an event-driven indicator (EDI). The CQI transmitted through the encoding type 0 may be a modulation and coding scheme (MCS) level, that is, an effective CQI. Furthermore, the STC rate transmitted through the encoding type 0 may be any one of 1 to 4. The encoding type 1 may be used for the index of a best-1 subband that will measure a narrow band CQI or the report of an EDI. The encoding type 2 may be used for a PMI report. $C(N_t, M_t, N_B, i)$, that is, the PMI of an $i^{th}$ codebook entry, may be mapped to a sequence index i within the PFBCH. The encoding type 3 may be used for a CQI or EDI report. The CQI transmitted through the encoding type 3 may be an MCS level. Furthermore, the STC rate transmitted through the encoding type 3 may be 1/2.

Figure 6:
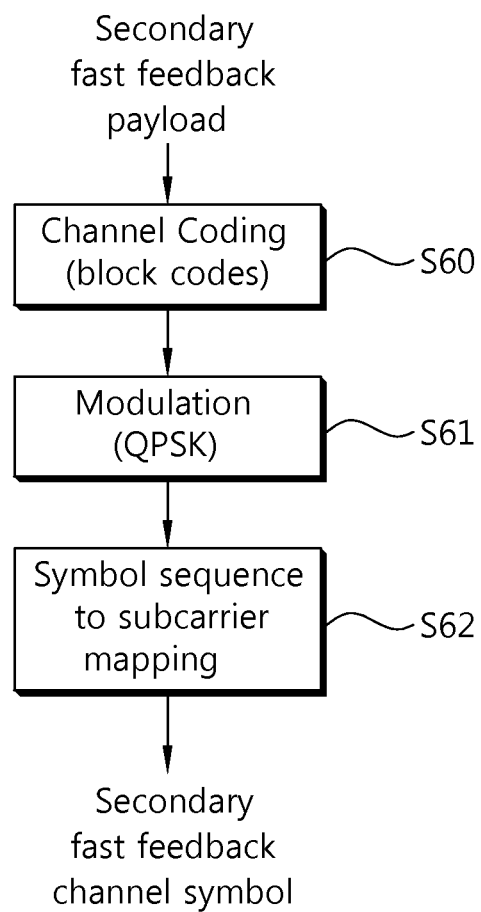
FIG. 6 is a block diagram showing a process in which feedback information is mapped to an SFBCH.

FIG. 6 is a block diagram showing a process in which feedback information is mapped to an SFBCH. The SFBCH includes three distributed FMTs like the PFBCH. At step S60, an SFBCH payload is subject to channel coding through a TBCC encoder. Here, a coding process may differ depending on the length of the payload. At step S61, a modulation symbol is generated by performing quadrature phase shift keying (QPSK) modulation on a channel-coded symbol. At step S62, the modulation symbol is mapped to the data subcarrier of an FMT.

Table 4 shows an example of feedback contents transmitted through an SFBCH. The SFBCH can carry feedback information of 7 to 24 bits. The length of the feedback information transmitted through the SFBCH may change adaptively.

TABLE 4

| SFBCH Feedback Content | Related MIMO feedback mode | Description/Notes |
|---|---|---|
| Subband CQI | 2, 3, 5, 6 | Reporting of average and differential CQI of selected subbands |
| Subband index | 2, 3, 5, 6 | Indicating the selected subbands |
| Subband PMI | 3, 6 | Precoding Matrix Indicator of one subband for CL MIMO |
| Stream Indicator | 5 | It is needed for OL Mu MIMO only and used to indicate which spatial stream to estimate CQI |
| STC Rate Indicator | 2, 3, 5, 6 | |
| PFBCH Indicator | 2, 3, 5, 6 | One bit indicator used for indicating the transmission of PFBCH in the next SFBCH opportunity. In the transmission of PFBCH, encoding type 0 is used. |

Referring to Table 4, a PFBCH indicator is transmitted through the SFBCH. The PFBCH indicator is a field indicating whether PFBCH feedback is instead transmitted in a next SFBCH transmission opportunity. The PFBCH indicator may be 1 bit. When the value of the PFBCH indicator is 1, PFBCH feedback is transmitted instead of SFBCH feedback in a next feedback transmission opportunity irrespective of whether the SFBCH feedback is transmitted in a short-term feedback period or a long-term feedback period. Here, the feedback transmitted through the PFBCH may be transmitted using the encoding type 0. Meanwhile, the PFBCH indicator may be transmitted through one least significant bit (LSB) when it is transmitted through an SFBCH, and the remaining pieces of feedback information may be transmitted from a next LSB in order of feedback fields within a feedback format.

Figure 7:
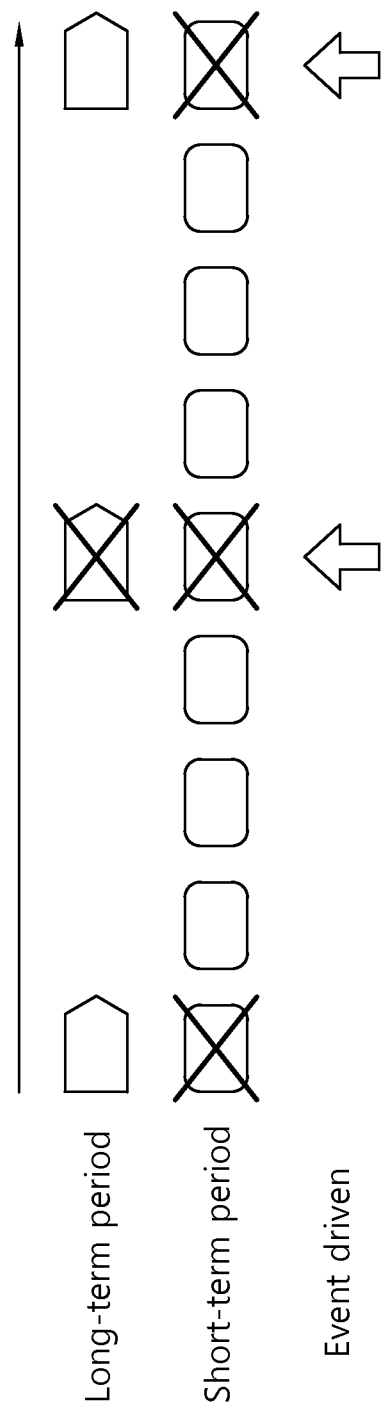
FIG. 7 shows an example of the transmission of short-term feedback information, long-term feedback information, and event-driven feedback information.

FIG. 7 shows an example of the transmission of short-term feedback information, long-term feedback information, and event-driven feedback information. Referring to FIG. 7, the short-term feedback information is transmitted every frame. The long-term feedback information is transmitted every four frames. The transmission of the long-term feedback information and the transmission of the short-term feedback information overlap with each other in the frame where the long-term feedback information is transmitted. In this case, the long-term feedback information having priority over the short-term feedback information is first transmitted. Furthermore, the event-driven feedback information that has priority over the short-term feedback information and the long-term feedback information is first transmitted. FIG. 7 shows that the event-driven feedback information that has priority over the long-term feedback information in the frame where the long-term feedback information is transmitted is first transmitted, but not limited thereto.

Meanwhile, if feedback information is transmitted on a PFBCH according to the encoding type 2 as described above, the event-driven feedback information cannot be transmitted. Furthermore, when a PFBCH indicator is transmitted on an SFBCH and a PFBCH is transmitted in a next SFBCH transmission opportunity instead of the SFBCH, it is difficult to define a position at which event-driven feedback information is transmitted because an accurate position at which the PFBCH indicator is transmitted is not defined. Accordingly, there is a need for a method of transmitting event-driven feedback information efficiently.

A feedback transmission method proposed through an embodiment is described below.

Figure 8:
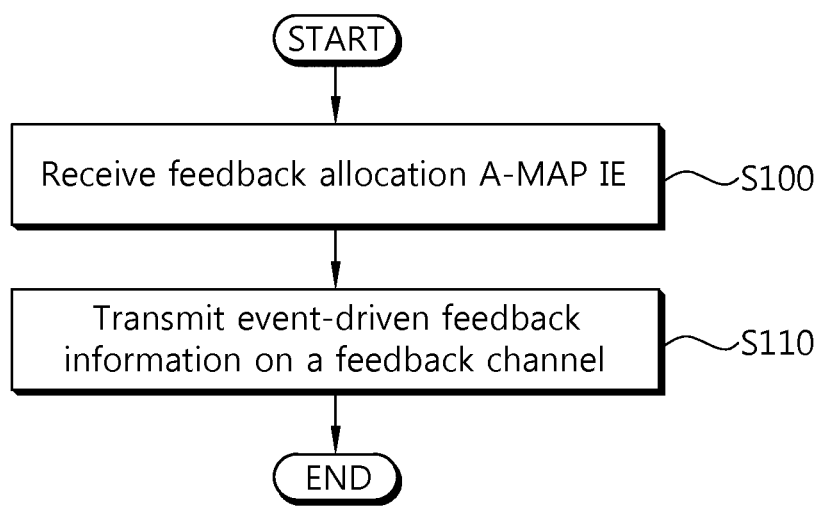
FIG. 8 is an embodiment of the proposed feedback transmission method.

FIG. 8 is an embodiment of the proposed feedback transmission method. At step S100, an MS receives a feedback allocation A-MAP IE from a BS. At step S110, the MS transmits event-driven feedback information to the BS. The event-driven feedback information is transmitted based on a long-term feedback period that is indicated by the feedback allocation A-MAP IE.

A variety of methods may be proposed in order to transmit the event-driven feedback information based on the long-term feedback period.

1) The encoding types 0, 1, and 3 may include event-driven feedback information when transmitting the event-driven feedback information on a PFBCH. Thus, when an event occurs, the event-driven feedback information may be transmitted according to the encoding types 0, 1, and 3 based on a long-term feedback period.

Or, feedback not including event-driven feedback information as in the encoding type 2 may be transmitted in each long-term feedback period, and feedback that may include event-driven feedback information as in the encoding types 0, 1, and 3 may be transmitted in each short-term feedback period. Even in this case, the event-driven feedback information may be transmitted based on the long-term feedback period. To this end, the event-driven feedback information may be transmitted only at a specific point of time of the short-term feedback period through the encoding types 0, 1, and 3, and the specific point of time may be repeated every long-term feedback period.

Figure 9:
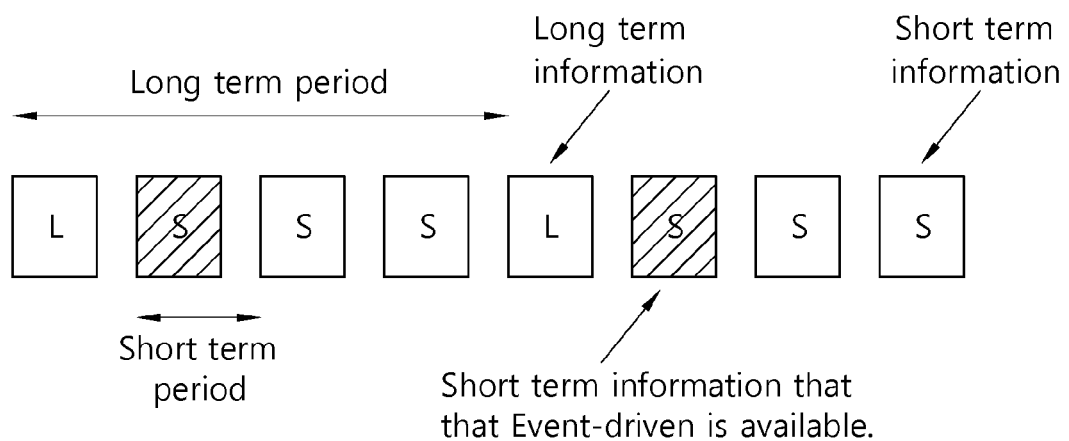
FIG. 9 shows an example of the transmission of event-driven feedback information according to a proposed feedback transmission method.

FIG. 9 shows an example of the transmission of event-driven feedback information according to a proposed feedback transmission method. Referring to FIG. 9, a long-term feedback period is set to be 4 times a short-term feedback period. Event-driven feedback information may be transmitted in each long-term feedback period at a point of time at which short-term feedback information is transmitted. A point of time at which the event-driven feedback information may be transmitted may be a point of time at which the short-term feedback information is transmitted right before or right after a point of time at which long-term feedback information is transmitted. In FIG. 9, a point of time at which event-driven feedback information may be transmitted is a point of time at which short-term feedback information is transmitted right after a point of time at which long-term feedback information is transmitted, but not limited thereto. The point of time at which the event-driven feedback information may be transmitted has only to be repeated every long-term feedback period.

2) Event-driven feedback information may be transmitted on a PFBCH according to a PFBCH indicator that is transmitted through an SFBCH. The PFBCH indicator may also be transmitted in a long-term feedback period so that the event-driven feedback information may be transmitted according to the long-term feedback period. If feedback is transmitted on an SFBCH only in any one of a short-term feedback period and a long-term feedback period, a PFBCH indicator may be transmitted in the long-term feedback period. Table 5 shows an example of feedback formats when MIMO feedback mode in which a PFBCH indicator is transmitted in a long-term feedback period according to the proposed feedback transmission method is 2.

TABLE 5

| Feedback Format | FBCH | # reports | | Feedback Fields | Description/Notes |
|---|---|---|---|---|---|
| 0 (M = 1) | PFBCH | 2 | Short | Subband CQI and STC rate (rate = 1 and 2) | Joint encoding of CQI and STC rate with PFBCH PFBCH encoding Type 0 |
| 0 (M = 1) | PFBCH | 2 | Long | Subband index | PFBCH encoding Type 1 |
| 1 (M = 1) | SFBCH | 2 | Short | Subband index Subband CQI STC rate | Subband index for 5, 10, or 20 MHz Support of STC rate 1 to 8 |
| 1 (M = 1) | SFBCH | 2 | Long | PFBCH indicator | |
| 2 (M = 3) | SFBCH | 2 | Short | Subband avg CQI differential CQI | Subband index for 5, 10, or 20 MHz |
| 2 (M = 3) | SFBCH | 2 | Long | Subband index Wideband STC rate PFBCH indicator | Subband index for 5, 10, or 20 MHz |
| 3 (M = 5) | SFBCH | 2 | Short | Subband avg CQI differential CQI | Subband index for 5, 10, or 20 MHz |
| 3 (M = 5) | SFBCH | 2 | Long | Subband index Wideband STC rate PFBCH indicator | Subband index for 5, 10, or 20 MHz |

According to Table 5, when MIMO feedback mode is 2 and feedback mode is 1, a PFBCH indicator may be transmitted in a long-term feedback period. In other MIMO feedback modes, a PFBCH indicator may be transmitted in a long-term feedback period as described above.

Figure 10:
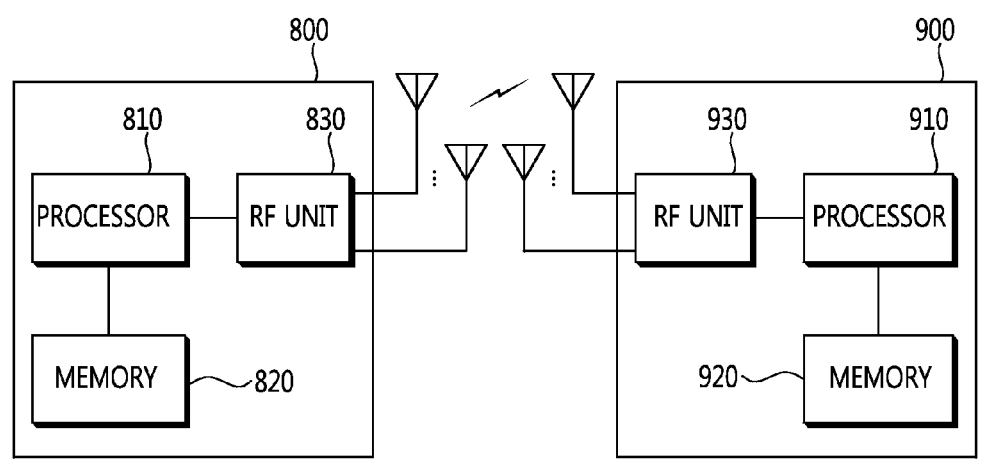
FIG. 10 is a block diagram of a BS and an MS to which the embodiments of the present invention are implemented.

FIG. 10 is a block diagram of a BS and an MS to which the embodiments of the present invention are implemented.

The BS 800 includes a processor 810, memory 820, and a radio frequency (RF) unit 830. The processor 810 implements the proposed functions, processes and/or methods. The layers of a wireless interface protocol may be implemented by the processor 810. The memory 820 is connected to the processor 810, and it stores various pieces of information for driving the processor 810. The RF unit 830 is connected to the processor 810, and it transmits and/or receives radio signals and transmits a feedback allocation A-MAP IE to an MS.

The MS 900 includes a processor 910, memory 920, and an RF unit 930. The RF unit 930 is connected to the processor 910, and it transmits and/or receives radio signals, receives a feedback allocation A-MAP IE from the BS, and transmits event-driven feedback information to the BS. The processor 910 implements the proposed functions, processes and/or methods. The layers of a wireless interface protocol may be implemented by the processor 910. The processor 910 processes a feedback allocation A-MAP IE and event-driven feedback information. The memory 920 is connected to the processor 910, and it stores various pieces of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting, by a mobile station, feedback in a wireless communication system, the method comprising:
   receiving downlink control information from a base station, and
   transmitting event-driven feedback information to the base station on a first feedback channel,
   wherein the downlink control information comprises information about a short-term feedback period that is a short period in which feedback information is transmitted and information about a long-term feedback period that is a long period in which feedback information is transmitted,
   wherein the event-driven feedback information is transmitted based on the long-term feedback period,
   wherein the event-driven feedback information is transmitted at a point of time at which the short-term feedback information is transmitted right before or right after a point of time at which the long-term feedback information is transmitted, wherein a first feedback channel indicator transmitted on a second feedback channel indicates the first feedback channel, wherein the first feedback channel indicator is transmitted in each long-term feedback period, and wherein the first feedback channel indicator has a length of 1 bit.

2. The method of claim 1, wherein the event-driven feedback information is transmitted on the first feedback channel using a first feedback channel encoding type 0.

3. The method of claim 1, wherein at least one of an index of a subband having a best channel state, a subband channel quality indicator (CQI), and an Space Time Coding (STC) rate is transmitted on the second feedback channel in each short-term feedback period.

4. The method of claim 1, wherein the event-driven feedback information has a priority over the short-term feedback information or the long-term feedback information.

5. The method of claim 1, wherein transmitting the event-driven feedback information comprises: generating a sequence based on the event-driven feedback information, modulating and repeating the generated sequence and mapping the generated sequence to a symbol, mapping the symbol to subcarriers of a feedback mini-tile (FMT), and transmitting the symbol mapped to the subcarriers.

6. The method of claim 5, wherein the FMT comprises 2 contiguous subcarriers and 6 orthogonal frequency division multiple access (OFDMA) symbols.

7. A mobile station, comprising:

a radio frequency (RF) unit configured to receive downlink control information from a base station and transmit event-driven feedback information to the base station on a first feedback channel; and a processor connected to the RF unit and configured to process the downlink control information and the event-driven feedback information, wherein the downlink control information comprises information about a short-term feedback period that is a short period in which feedback information is transmitted and information about a long-term feedback period that is a long period in which feedback information is transmitted, and wherein the event-driven feedback information is transmitted based on the long-term feedback period, wherein the event-driven feedback information is transmitted at a point of time at which the short-term feedback information is transmitted right before or right after a point of time at which the long-term feedback information is transmitted, wherein a first feedback channel indicator transmitted on a second feedback channel indicates the first feedback channel, wherein the first feedback channel indicator is transmitted in each long-term feedback period, and wherein the first feedback channel indicator has a length of 1 bit.

\* \* \* \* \*